United States Patent [19]

Foster

[11] 4,127,306
[45] Nov. 28, 1978

[54] OFFSET SPINDLE SUPPORT
[75] Inventor: Alan D. Foster, Adrian, Mich.
[73] Assignee: Dayton-Walther Corporation, Dayton, Ohio
[21] Appl. No.: 799,583
[22] Filed: May 23, 1977
[51] Int. Cl.² .............................................. B60B 35/06
[52] U.S. Cl. .................................. 301/127; 301/132; 188/218 R; 280/80 R
[58] Field of Search .................... 301/124 R, 125, 127, 301/126, 129, 131–133; 180/DIG. 1, 88; 280/80 R, 2; 188/218 R

[56] References Cited
U.S. PATENT DOCUMENTS
1,946,624  2/1934  Irish ...................................... 301/127

FOREIGN PATENT DOCUMENTS
684,844  12/1939  Fed. Rep. of Germany ........... 301/132

Primary Examiner—Robert B. Reeves
Assistant Examiner—Charles A. Marmor
Attorney, Agent, or Firm—Biebel, French & Nauman

[57] ABSTRACT

An offset spindle and spindle support for a mobile home axle is disclosed, in which the wheel spindle is vertically offset with respect to a conventional axle tube. The offset support comprises a generally cup-shaped stamping and utilizes the backing plate of the brake to form a box-section, low-cost high strength offset support for a forged wheel spindle.

4 Claims, 4 Drawing Figures

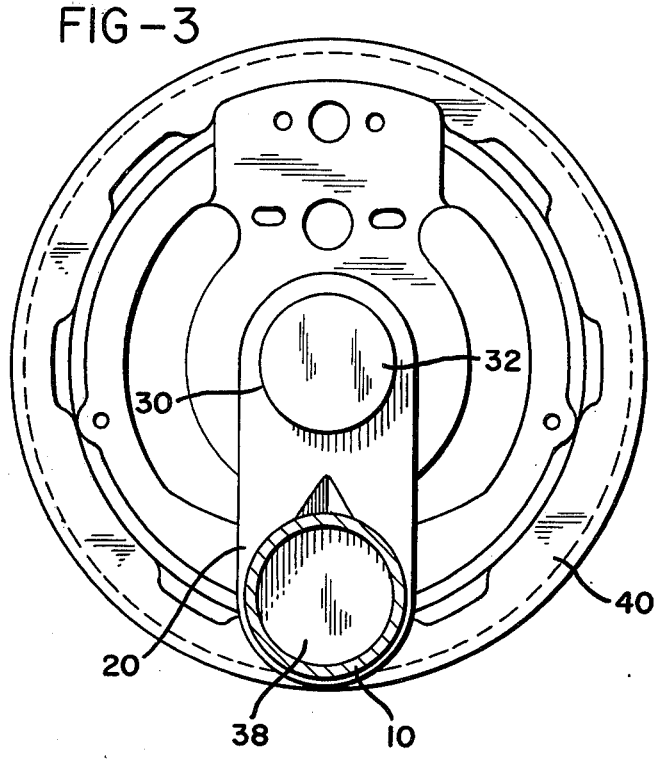
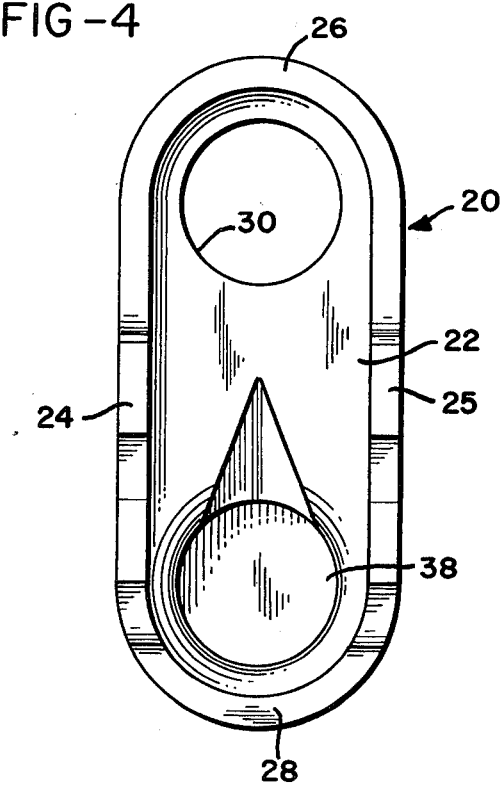

OFFSET SPINDLE SUPPORT

BACKGROUND OF THE INVENTION

The present invention relates to axles for travel trailers, mobile homes and the like, in which it has become a common practice to lower or offset the axle in relation to the wheel spindles, so that the axle is closer to the ground, thereby providing a lower profile for the unit mounted on the axle, while permitting the use of standard wheels and brakes. In the prior art, as illustrated in FIG. 1 herein, the offset has been effected by an integral portion of the forged spindle. This, however, results in a high cost item and does not utilize the brake backing plate as a support member.

SUMMARY OF THE INVENTION

The present invention is directed to an improved offset axle arrangement employing a generally cup-shaped metal stamping which engages and supports a forged stub spindle at one end, and engages the axle tube at the other end. The strength in the offset relation is enhanced by utilizing the backing plate of the electric brake as one element in the offset structure. Thus, the stamping is formed with side walls and a bottom wall which engage the adjacent surfaces of the backing plate. The side walls are welded to the brake backing plate and to the spindle stub. The combination of the cup-shaped support bracket and the backing plate forms a box-shaped or rectangular-shaped unit which has high strength and rigidity, low weight and low cost as compared to the solid forged spindle and offset of the prior art.

It is accordingly an object of this invention to provide a low cost, offset support for a wheel spindle on an axle.

Another object of the invention is the provision of an offset for a stub spindle which utilizes the brake backing plate as an integral part of the offsetting and supporting structure.

These and other objects and advantages of the invention will be apparent from the following description, the accompanying drawings and the appended claims.

BRIEF DESCRIPTION OF THE DRAWINGS

FIG. 3 is a rear view of the offset spindle arrangement, showing the support bracket and the back surface of the backing plate in elevation, and looking generally along the line 3—3 of FIG. 2; and FIG. 4 is a front elevation of the support bracket prior to the attachment of the stub spindle, the axle tube and the backing plate, looking into the interior of the bracket.

DESCRIPTION OF THE PRIOR ART

Figure 1:
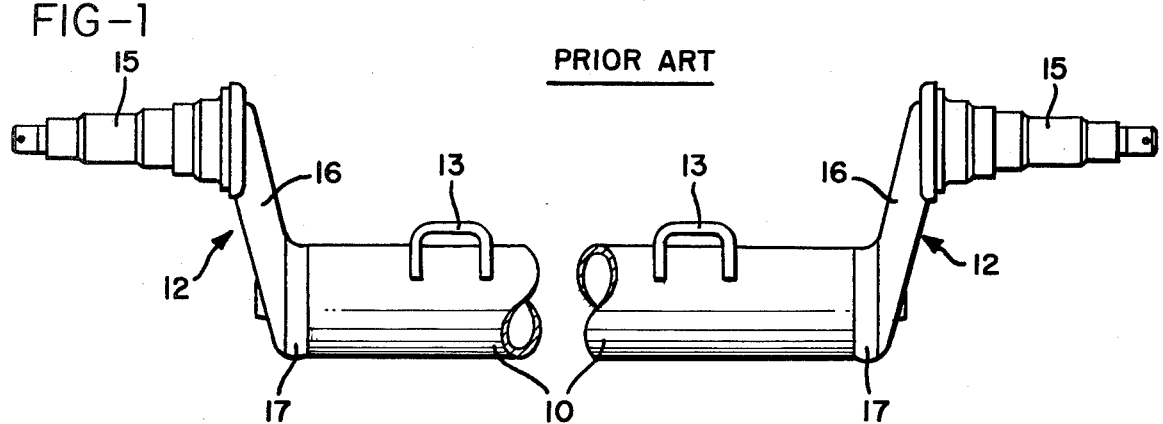
FIG. 1 is an elevational view, partially broken away, of an offset spindle and axle arrangement in accordance with the prior art.

With reference to FIG. 1, an axle tube 10 supports at either end thereof an integral forged offset and spindle 12. Spring mounting pads 13 are conventionally supported either on the upper or lower side of the axle tube 10, and may support thereon a leaf spring in the manner disclosed in the U.S. Pat. of Foster, No. 3,751,021 issued Aug. 7, 1973. Additionally, conventional electric brake backing plates (not shown) are welded to and supported on the spindle 12. The spindle 12 is a one-piece forging which has a conventional wheel supporting portion 15 and an integral vertically offset portion 16 terminating in a lower end 17. The lower end 17 has a portion thereof extending slightly into the interior of the axle 10 and is welded in place. The forging of the offset spindle 12 results in an expense, since the offset portion 16 exclusively provided the strength and support for the wheel portion 15. The brake backing plate was not utilized in any way as an offset support member.

DESCRIPTION OF THE PREFERRED EMBODIMENT

Figure 2:
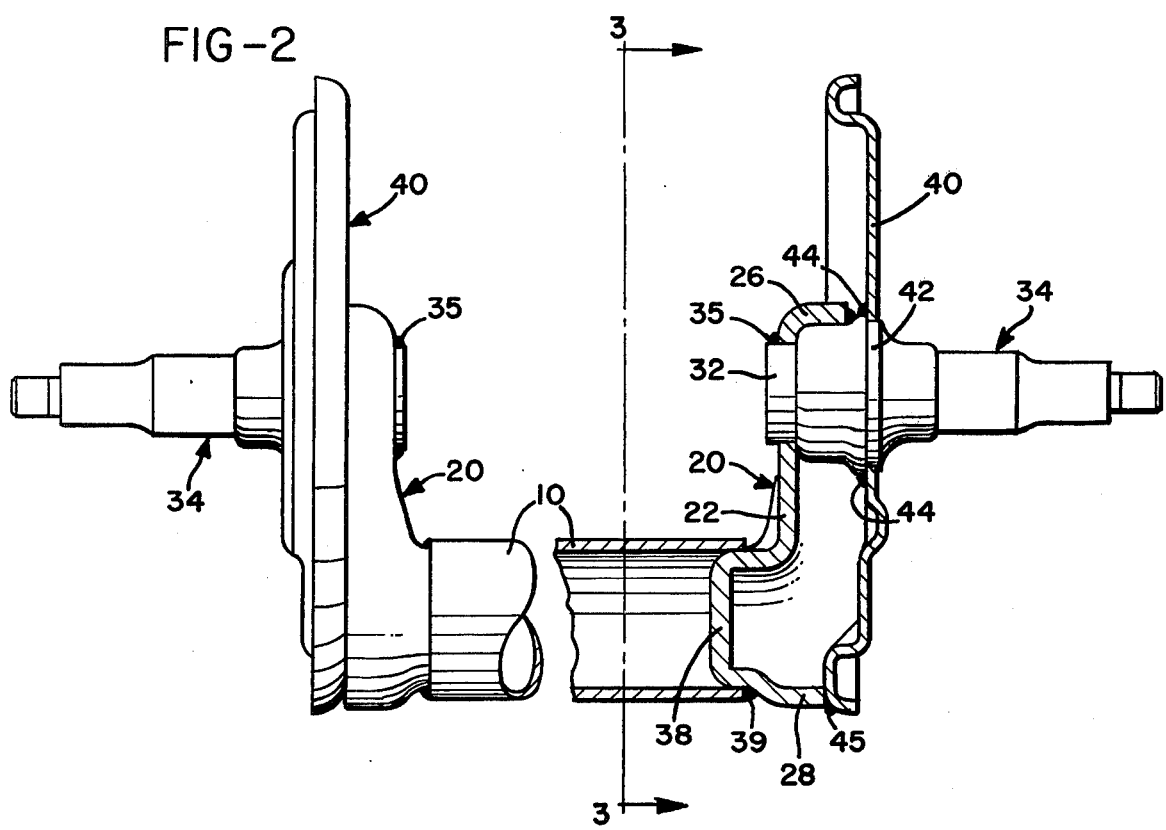
FIG. 2 is an enlarged elevational view, partially broken away and partially in section, of an offset spindle and axle arrangement according to the present invention.

Referring to FIGS. 2–4, an adapter bracket according to this invention for supporting a stub-shaped spindle in offset relation to an axle tube 10 is illustrated generally at 20. A bracket 20 may be formed as a cup-shaped metal stamping, and is shown in section at the right hand side of FIG. 2 and in front elevation in FIG. 4. Thus, the bracket 20 has a back or a back wall 22, a pair of identical, generally parallel, spaced-apart side walls 24 and 25, a semi-cylindrical top wall 26 and a semi-cylindrical bottom wall 28. The walls of the bracket are peripherally continuous and are thus formed as an integral part of the back wall 22.

The bracket 20 includes means in the back wall 22 adjacent the top wall 26 defining a stub axle receiving aperture or opening 30. The opening may be suitably pierced or punched in the bracket 20. The opening 30 is proportioned to receive a cylindrical boss 32 formed on the rear end of a forged stub axle 34, as best seen in FIG. 2. The boss 32 extends through the opening 30 and is welded peripherally at the outside surface of the back wall 22, as indicated by the weld 35.

The back wall 22 further defines a cylindrical, rearwardly projecting insert or boss portion 38 formed at the lower end thereof adjacent the bottom wall 28. This boss portion is proportioned to be inserted and received within the open end of the axle tube 10, and is welded peripherally thereto as indicated at 39.

A conventional sheet metal brake backing plate 40 is mounted on the spindle 34, at an annular ledge portion 42. The backing plate 40 forms an essential part of a conventional electric brake of the general type shown in the U.S. Pats. of Phair, No. 2,304,118 and Penrose, No. 2,273,065, both issued in 1942 and now expired. Such backing plates conventionally support brake shoes and an arcuate or curved brake shoe actuator, which, in turn, supports an electric magnet on the end thereof as disclosed in the U.S. Pat. of Tschabrun, No. 3,697,910 issued Oct. 10, 1972. Since the brake actuating mechanism including the magnetic armature plate brake arm, the magnet and the brake shown are of the conventional construction and are well known to those skilled in the art, these parts have been omitted for the sake of clarity and only the backing plate 40 is shown. The backing plate 40 forms an important element in the combination of the present invention.

When the backing plate is located on the spindle 34 and is welded in place by an annular weld 44 on the ledge 42, the back surface of this plate is in line contact or abutment with a major portion of the side walls 24 and 25 and the bottom wall 28. The offset structure is then completed by welding along the junction between the backing plate 40 and the support bracket 20 as indicated by the weld 45 in FIG. 2. Thus, the combination of the cup-shaped offset support bracket and the brake backing plate forms a substantially box-shaped, hollow offset support which has high strength which effectively utilizes the brake backing plate as a support element. Since a forged piece is eliminated, the cost and weight are reduced without sacrifice of strength.

While the form of apparatus herein described constitutes a preferred embodiment of this invention, it is to be understood that the invention is not limited to this precise form of apparatus, and that changes may be made therein without departing from the scope of the invention.

What is claimed is:

1. An adapter arrangement for supporting a wheel spindle in transversely offset relation to an axle, comprising a vertically elongated stamped metal support bracket, said support bracket having a back wall and a pair of spaced-apart side walls, means in said back wall adjacent the top thereof defining a stub spindle-receiving opening, a wheel spindle having a rearward portion extending through said opening and secured to said back wall at said opening, said back wall further defining an axle-receiving portion adjacent the bottom thereof, means securing said axle-receiving portion on the end of said axle, a brake backing plate mounted on said spindle and joined thereto, said bracket side walls being in abutment with the adjacent surface of said backing plate throughout a substantial portion of the longitudinal lengths of said side walls, and means welding said bracket side walls to said backing plate thereby forming with said backing plate an offset spindle support.

2. An adapter arrangement for supporting a wheel spindle in transversely offset relation to a tube-type axle, comprising a vertically elongated support bracket, said support bracket having a back, a pair of spaced-apart side walls, a top wall and a bottom wall, means in said back adjacent said top wall defining a stub spindle receiving opening, a wheel spindle having a rearward portion extending through said opening and secured to said back at said opening, said back further defining a rearwardly-projecting boss portion adjacent the bottom wall, said boss portion being proportioned to be interfitted with said axle, means securing said boss portion in interfitted relation to said axle, a brake backing plate mounted on said spindle and joined thereto, said bracket walls being in abutment with the adjacent surface of said backing plate throughout a substantial portion of the longitudinal length of said walls, and means welding said bracket to said backing late at said walls thereby forming with said backing plate an offset spindle support.

3. An adapter arrangement for supporting the backing plate of an electric brake and a wheel spindle in transversely offset relation to an axle tube, comprising a generally cup-shaped vertically elongated support bracket, said support bracket having a back, a pair of generally parallel spaced-apart side walls, a top wall and a bottom wall, means in said back adjacent said top wall defining a spindle-receiving opening, a wheel spindle having a rearward portion extending through said opening and welded to said back at said opening and at said top wall, said back further defining a portion adjacent the bottom wall thereof adapted to be interfitted with said axle tube and being welded to said tube at the junction thereof, an electric brake backing plate mounted on said spindle forwardly of said bracket and welded to said spindle, at least said side walls and said bottom wall of said bracket being in abutment with the adjacent surface of said backing plate throughout a substantial portion of the lengths of said walls and being welded along said abutment to said backing plate thereby forming with said backing plate an offset hollow spindle support.

4. In a running gear, means for supporting a spindle in transversely offset relation to an axle tube, comprising a generally cup-shaped vertically elongated support bracket, said support bracket having a back, a pair of generally parallel spaced-apart side walls, a top wall and a bottom wall, said walls being peripherally continuous and formed integrally with said back, means in said back adjacent said top wall defining a stub spindle-receiving opening, said spindle having a rearward boss portion extending through said opening and welded to said back at said opening, said back further defining a cylindrical, rearwardly-projecting boss portion adjacent the bottom wall, said portion being proportioned to be inserted within an open end of said axle tube and being welded to said tube at the junction thereof, a brake backing plate mounted on said spindle and welded thereto, said side and bottom walls being in edge abutment with the adjacent surface of said backing plate throughout a substantial portion of the longitudinal length of said walls, and being welded to said backing plate, thereby forming with said backing plate an offset spindle support which is substantially box-shaped in transverse section.

* * * * *